(12) United States Patent
Shin et al.

(10) Patent No.: US 11,613,162 B2
(45) Date of Patent: Mar. 28, 2023

(54) AIR CONDITIONING SYSTEM FOR VEHICLE

(71) Applicants: Hyundai Motor Company, Seoul (KR); Kia Motors Corporation, Seoul (KR)

(72) Inventors: Gee Young Shin, Suwon-si (KR); Seung Sik Han, Hwaseong-si (KR); Dong Ho Kwon, Yongin-si (KR); Myung Hoe Kim, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 322 days.

(21) Appl. No.: 17/015,865

(22) Filed: Sep. 9, 2020

(65) Prior Publication Data
US 2021/0323377 A1    Oct. 21, 2021

(30) Foreign Application Priority Data
Apr. 21, 2020  (KR) .................. 10-2020-0048214

(51) Int. Cl.
*B60H 1/00*  (2006.01)
*B60H 1/32*  (2006.01)

(52) U.S. Cl.
CPC ..... *B60H 1/00842* (2013.01); *B60H 1/00021* (2013.01); *B60H 1/00485* (2013.01); *B60H 1/00564* (2013.01); *B60H 1/00664* (2013.01); *B60H 1/3227* (2013.01); *B60H 1/3228* (2019.05); *B60H 2001/00092* (2013.01); *B60H 2001/00721* (2013.01); *B60H 2001/3277* (2013.01); *B60H 2001/3282* (2013.01)

(58) Field of Classification Search
CPC ...... F24F 11/84; F25B 41/20; B60H 1/00571; B60H 1/00664; B60H 1/3227; B60H 1/3228; B60H 2001/3279; B60H 1/00921; B60H 2001/00949; B60H 2001/00928
USPC .................................................. 454/139-165
See application file for complete search history.

(56) References Cited

U.S. PATENT DOCUMENTS 9,950,591 B2 * 4/2018 Kuroda .............. B60H 1/32284
10,040,333 B2 * 8/2018 Shin ................... B60H 1/00899
(Continued)

FOREIGN PATENT DOCUMENTS

JP       2020045068 A  *  3/2020  ......... B60H 1/00921
KR   10-2018-0038728 A     4/2018

*Primary Examiner* — Ko-Wei Lin
(74) *Attorney, Agent, or Firm* — Morgan, Lewis & Bockius LLP

(57) ABSTRACT

An air conditioning system for a vehicle may include a refrigerant line through which a refrigerant circulates and an evaporator and a condenser are connected to each other; and a first core and a second core for indoor air conditioning, wherein the first core includes a first inlet and a first outlet through which a coolant passing through the evaporator is introduced and discharged, respectively, the second core includes a second inlet and a second outlet through which a coolant passing through the condenser is introduced and discharged, respectively, and the first core and the second core are connected to each other through a connection line, and the connection line is provided with a first valve selectively connecting the first core and the second core through the connection line.

12 Claims, 5 Drawing Sheets

(56) References Cited

U.S. PATENT DOCUMENTS

| | | | |
|---|---|---|---|
| 2009/0038774 A1* | 2/2009 | Ogiso | B60H 1/245 62/239 |
| 2011/0114739 A1* | 5/2011 | Misumi | B60H 1/00742 454/143 |
| 2015/0082820 A1* | 3/2015 | Takahashi | B60H 1/0005 62/238.7 |
| 2015/0290999 A1* | 10/2015 | Wiesmann | B60H 1/0005 236/13 |
| 2015/0323225 A1* | 11/2015 | Matsumoto | F28D 1/05375 62/324.1 |
| 2017/0203635 A1* | 7/2017 | Kuroda | B60H 1/00342 |
| 2018/0361828 A1* | 12/2018 | Kato | F25B 6/04 |
| 2019/0047352 A1* | 2/2019 | Kim | B60H 1/00278 |
| 2019/0061543 A1* | 2/2019 | Jovet | B60L 53/31 |
| 2019/0154311 A1* | 5/2019 | Miura | F25B 1/00 |
| 2019/0184790 A1* | 6/2019 | Miura | B60H 1/3211 |
| 2019/0241044 A1* | 8/2019 | Ito | B60H 1/22 |
| 2019/0366800 A1* | 12/2019 | Durrani | B60H 1/32284 |
| 2020/0041072 A1* | 2/2020 | Werlen | F25B 9/008 |
| 2020/0282806 A1* | 9/2020 | Sharma | B60H 1/00907 |
| 2020/0398645 A1* | 12/2020 | He | F25B 41/26 |
| 2021/0323379 A1* | 10/2021 | Kaneko | B60H 1/32284 |

* cited by examiner

AIR CONDITIONING SYSTEM FOR VEHICLE

CROSS REFERENCE TO RELATED APPLICATION

The present application claims priority to Korean Patent Application No. 10-2020-0048214, filed Apr. 21, 2020, the entire contents of which is incorporated herein for all purposes by this reference.

BACKGROUND OF THE INVENTION

Field of the Invention

The present invention relates to an air conditioning system for a vehicle, and more particularly, to an air conditioning system for a vehicle applicable to air-conditioning the interior of the vehicle by including a secondary loop system configured by integrating a cooler and a heater in terms of the function in air-conditioning the interior of the vehicle to have improved performance and a reduced overall size.

Description of Related Art

As a generation of vehicle is changed, the importance of a cooling function has been further emphasized. A cooling and air-conditioning system using a battery influences directly on power consumption, when compared to conventional IC engines, and thus has an object to reduce the direct influence on power consumption. Also, thermal management of the battery, which is an energy source, has been a big issue for the new generation of vehicle, unlike conventional vehicles, and the importance of integrated thermal management has been emphasized because there is a gradual increase in the number of parts requiring thermal management in a vehicle toward an electrical and autonomous driving era.

When the integrated thermal management is done by a single system in which a cooling portion and an air conditioning portion are integrated, the management is easy and the single system integrally utilizes the same material without separate heat exchangers for the cooling portion and the air conditioning portion, respectively. Thus, cooling and heating functions are integrated into a single system, and each of the required functions is performed through a method using a coolant.

However, the integrated thermal management is usually accomplished by a secondary loop system, which is not yet available for indoor air conditioning due to its insufficient performance.

Therefore, there has been a need to develop a technology concerning a secondary loop system applicable to indoor air conditioning.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an air conditioning system for a vehicle applicable to air-conditioning the interior of the vehicle by including a secondary loop system configured by integrating a cooler and a heater in terms of function to have improved air conditioning performance and a reduced overall size.

According to various exemplary embodiments of the present invention, an air conditioning system for a vehicle includes: a refrigerant line through which a refrigerant circulates and an evaporator and a condenser are connected to each other; and a first core and a second core for indoor air conditioning, wherein the first core includes a first inlet and a first outlet through which a coolant passing through the evaporator is introduced and discharged, respectively, the second core includes a second inlet and a second outlet through which a coolant passing through the condenser is introduced and discharged, respectively, and the first core and the second core are connected to each other through a connection line, and the connection line is provided with a first valve selectively connecting the first core and the second core through the connection line.

The air conditioning system for a vehicle may further include a second valve configured of regulating the first inlet and the first outlet of the first core and the second inlet and the second outlet of the second core to be opened or closed.

In a cooling mode, the second inlet and the second outlet may be closed via the second valve, and the first valve may be opened to connect the first core and the second core to each other such that the coolant introduced from the evaporator through the first inlet circulates through the first core and the second core and is discharged through the first outlet.

In a heating mode, the first inlet and the first outlet may be closed via the second valve, and the first valve may be opened to connect the first core and the second core to each other such that the coolant introduced through the second inlet from the condenser circulates through the first core and the second core and is discharged through the second outlet.

In a dehumidifying mode, the first valve may be closed to disconnect the first core and the second core from each other, and the first inlet, the first outlet, the second inlet, and the second outlet may be opened via the second valve such that the coolant introduced from the evaporator through the first inlet circulates through the first core and is discharged through first outlet, and the coolant introduced from the condenser through the second inlet circulates through the second core and is discharged through the second outlet.

The air conditioning system for a vehicle may further include: a duct in which the first core and the second core are mounted; and a blower provided at an entrance of the duct.

The duct may be branched into a first duct and a second duct, and the first core may be mounted in front of a branch point at which the duct is branched into the first duct and the second duct, and the second core may be mounted in the second duct.

A door regulating introduction of air passing through the first core into the interior of the vehicle through the first duct may be mounted in the first duct.

In a cooling mode, the door may be open to allow the air passing through the first core to be introduced into the interior of the vehicle through the first duct.

In a heating mode, the door may be closed to interrupt the air passing through the first core from being introduced into the interior of the vehicle through the first duct.

In a dehumidifying mode, the door may be partially closed to allow the air passing through the first core to be partially introduced into the interior of the vehicle through the first duct.

The methods and apparatuses of the present invention have other features and advantages which will be apparent from or are set forth in more detail in the accompanying drawings, which are incorporated herein, and the following

Figure 1:
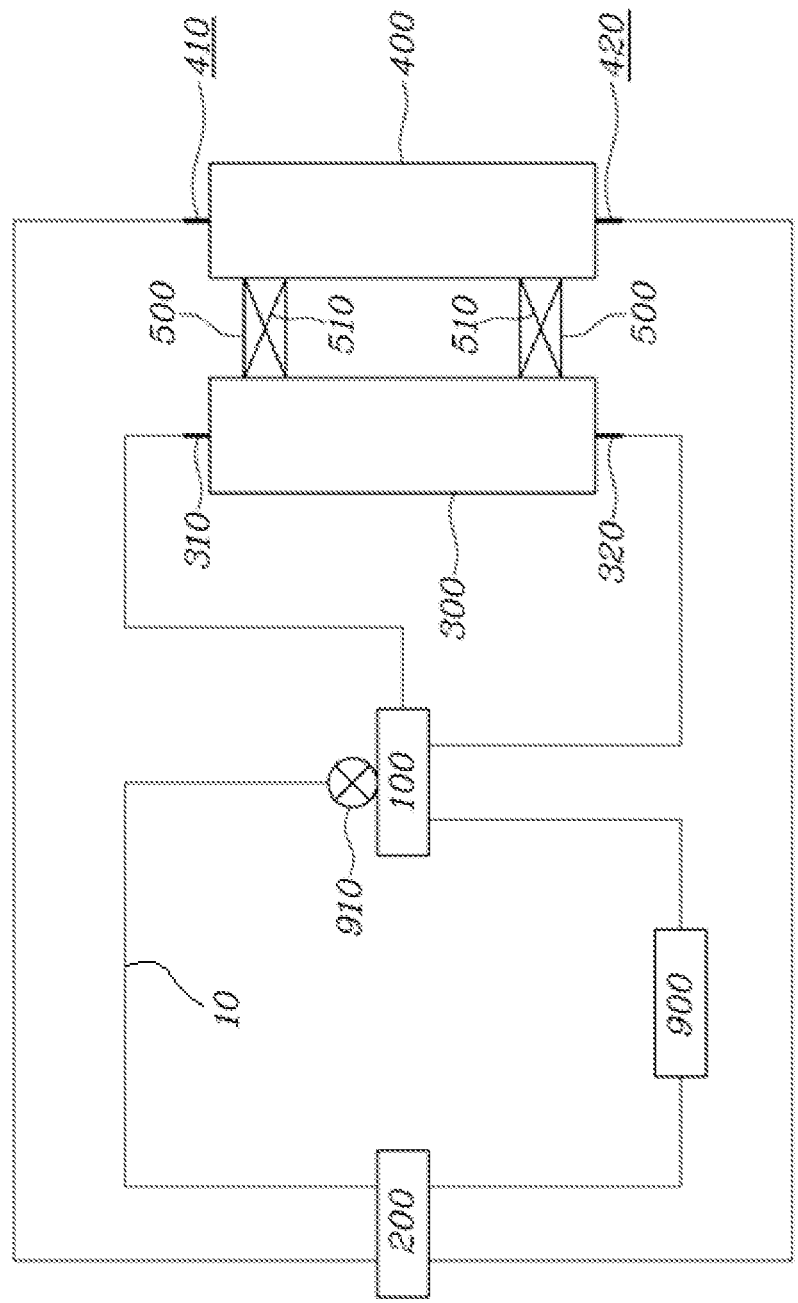
FIG. 1 is a view schematically illustrating an overall configuration of an air conditioning system for a vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 2:
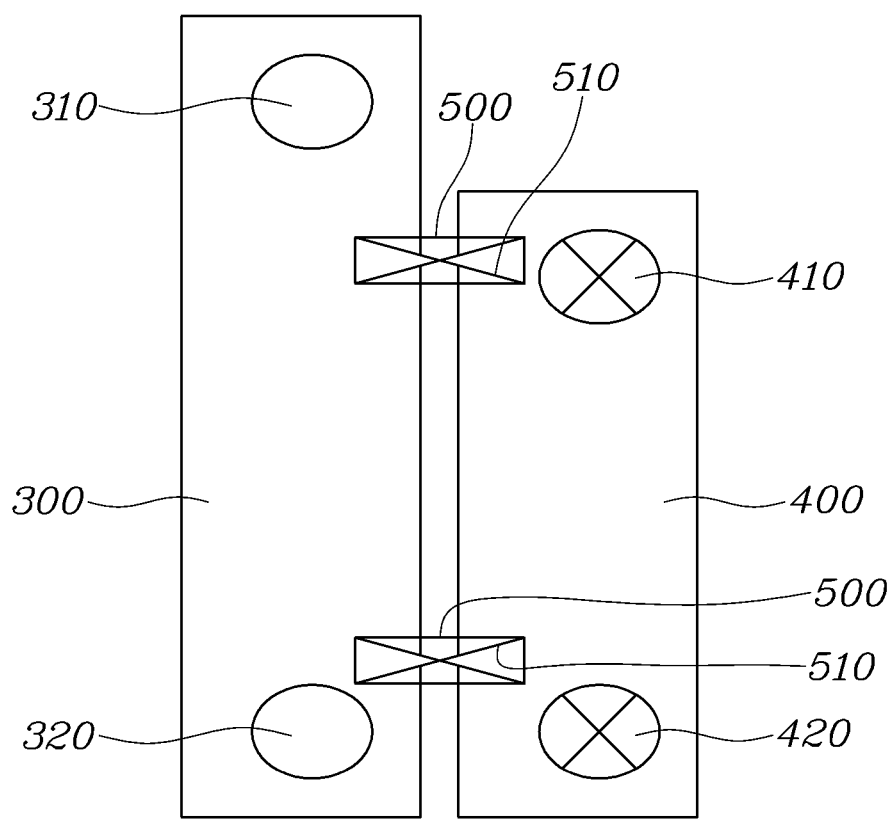
FIG. 2 is a view exemplarily illustrating that a first core and a second core are connected to each other through a connection line in the air conditioning system for a vehicle according to various exemplary embodiments of the present invention.
Figure 3:
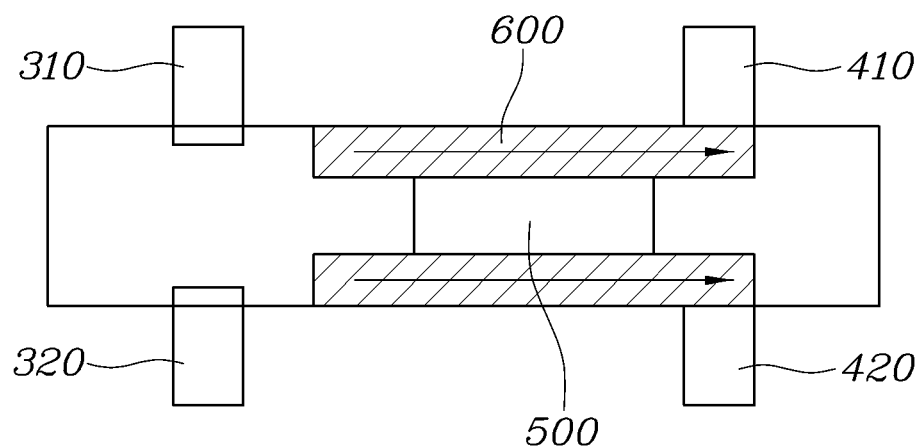
FIG. 3 is a view exemplarily illustrating that the air conditioning system for a vehicle according to various exemplary embodiments of the present invention is operated in a cooling mode.
Figure 4:
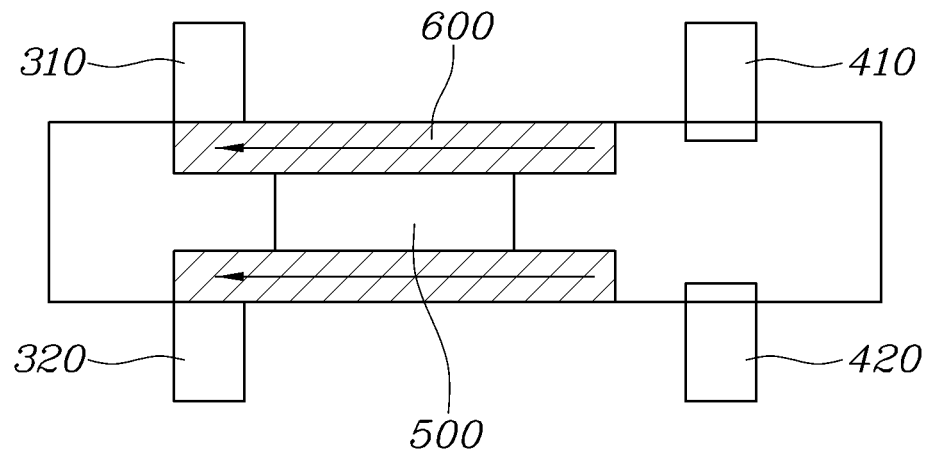
FIG. 4 is a view exemplarily illustrating that the air conditioning system for a vehicle according to various exemplary embodiments of the present invention is operated in a heating mode.
Figure 5:
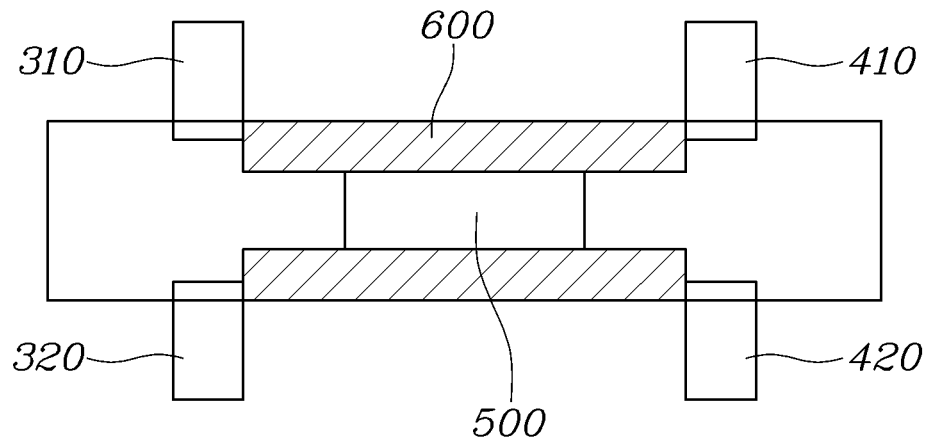
FIG. 5 is a view exemplarily illustrating that the air conditioning system for a vehicle according to various exemplary embodiments of the present invention is operated in a dehumidifying mode.
Figure 6:
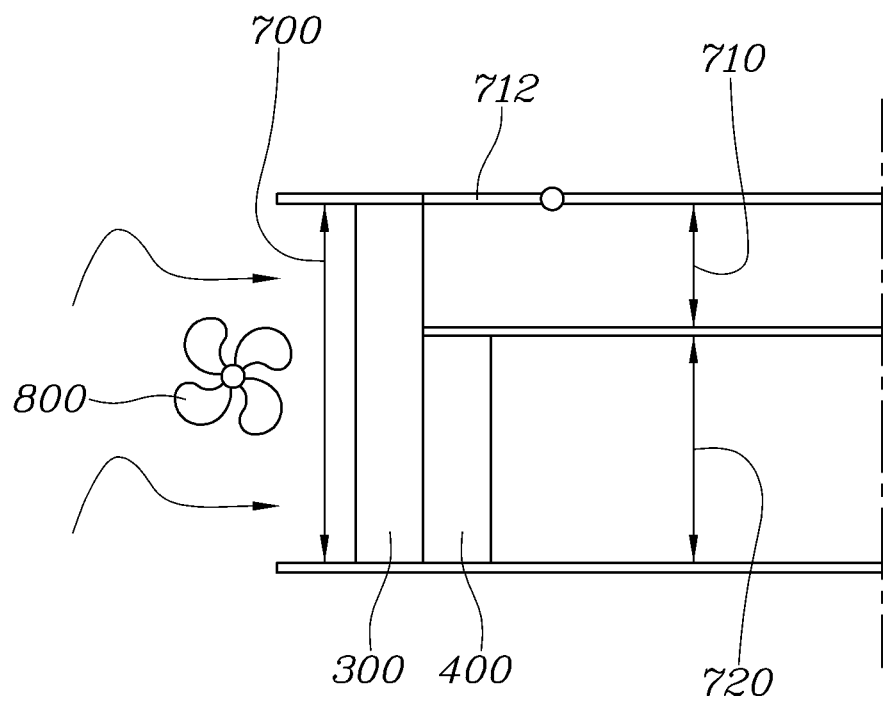
FIG. 6 is a view exemplarily illustrating that a door opens a first duct in the cooling mode of the air conditioning system for a vehicle according to various exemplary embodiments of the present invention.
Figure 7:
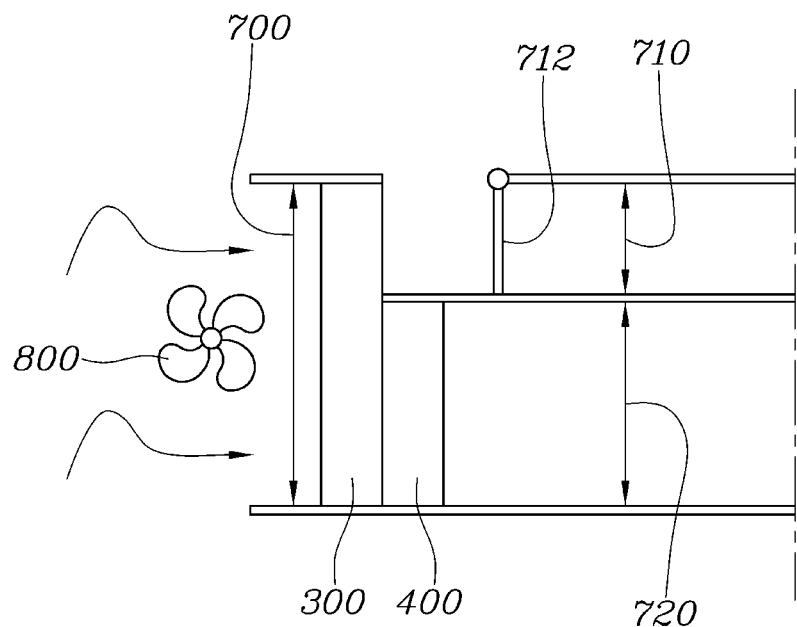
FIG. 7 is a view exemplarily illustrating that the door closes the first duct in the heating mode of the air conditioning system for a vehicle according to various exemplary embodiments of the present invention.
Figure 8:
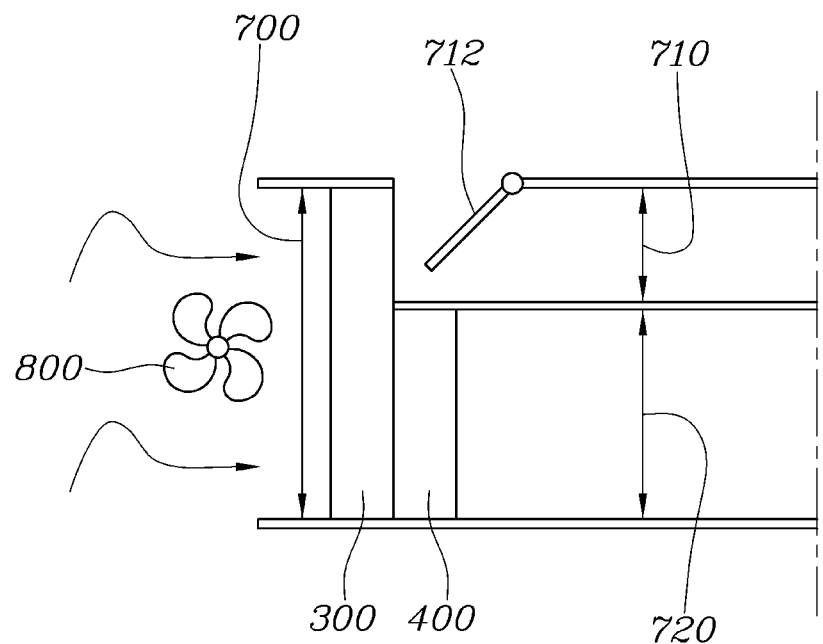
FIG. 8 is a view exemplarily illustrating that the door partially closes the first duct in the dehumidifying mode of the air conditioning system for a vehicle according to various exemplary embodiments of the present invention.

FIG. 1 is a view schematically illustrating an overall configuration of an air conditioning system for a vehicle according to various exemplary embodiments of the present invention, FIG. 2 is a view exemplarily illustrating that a first core and a second core are connected to each other through a connection line in the air conditioning system for a vehicle according to various exemplary embodiments of the present invention, FIG. 3 is a view exemplarily illustrating that the air conditioning system for a vehicle according to various exemplary embodiments of the present invention is operated in a cooling mode, FIG. 4 is a view exemplarily illustrating that the air conditioning system for a vehicle according to various exemplary embodiments of the present invention is operated in a heating mode, FIG. 5 is a view exemplarily illustrating that the air conditioning system for a vehicle according to various exemplary embodiments of the present invention is operated in a dehumidifying mode, FIG. 6 is a view exemplarily illustrating that a door opens a first duct in the cooling mode of the air conditioning system for a vehicle according to various exemplary embodiments of the present invention, FIG. 7 is a view exemplarily illustrating that the door closes the first duct in the heating mode of the air conditioning system for a vehicle according to various exemplary embodiments of the present invention, and FIG. 8 is a view exemplarily illustrating that the door partially closes the first duct in the dehumidifying mode of the air conditioning system for a vehicle according to various exemplary embodiments of the present invention.

Referring to FIG. 1, the air conditioning system for a vehicle according to various exemplary embodiments of the present invention may include a refrigerant line 10 through which a refrigerant circulates and an evaporator 100 and a condenser 200 are connected to each other, and a first core 300 and a second core 400 for indoor air conditioning. Here, a compressor 900 and an expansion valve 910 may be included in the refrigerant line such that the refrigerant circulates through the compressor 900, the condenser 200, the expansion valve, and the evaporator 100, achieving a general cooling cycle.

Furthermore, the air conditioning system for a vehicle according to the exemplary embodiment of the present invention may include a first cooling line along which a coolant circulates through the evaporator 100 and the first core 300, and a second cooling line along which a coolant circulates through the condenser 200 and the second core 400.

The first core 300 may include a first inlet 310 and a first outlet 320 through which the coolant passing through the evaporator 100 is introduced and discharged, respectively. Furthermore, the second core 400 may include a second inlet 410 and a second outlet 420 through which the coolant passing through the condenser 200 is introduced and discharged, respectively.

In other words, the coolant circulating along the first cooling line may be introduced into the first core 300 through the first inlet 310 and discharged through the first outlet 320, and the coolant circulating along the second cooling line may be introduced into the second core 400 through the second inlet 410 and discharged through the second outlet 420.

Meanwhile, referring to FIG. 2, the first core 300 and the second core 400 may be connected to each other through a connection line 500. Furthermore, the connection line 500 may be provided with a first valve 510 communicatively selectively connecting the first core 300 and the second core 400 to/from each other. Here, the first valve 510 may be controlled to communicatively connect or disconnect the first core 300 and the second core 400 to/from each other, depending on whether the air conditioning mode of the vehicle is a cooling mode, a heating mode, or a dehumidifying mode. According to the exemplary embodiment of the present invention, the first valve 510 may be a two-way valve such as a solenoid valve.

Furthermore, the air conditioning system for a vehicle according to various exemplary embodiments of the present invention may further include a second valve 600 regulating the first inlet 310 and the first outlet 320 of the first core 300 and the second inlet 410 and the second outlet 420 of the second core 400 to be opened or closed. Like the first valve 510, the second valve 600 may be controlled to regulate the opening or closing of the first inlet 310 and the first outlet 320 of the first core 300 and the second inlet 410 and the second outlet 420 of the second core 400, depending on whether the air conditioning mode of the vehicle is the cooling mode, the heating mode, or the dehumidifying mode. According to the exemplary embodiment of the present invention, the second valve 600 may slide as illustrated in FIG. 4 to regulate the first inlet 310, the second inlet 410, the first outlet 320, and the second outlet 420 to be opened or closed. However, the sliding-type valve for regulating the first inlet 310, the second inlet 410, the first outlet 320, and the second outlet 420 to be opened or closed is an example, and another type of valve may be variously used as the second valve 600 in various exemplary embodiments of the present invention if it is configured for regulating the first inlet 310, the second inlet 410, the first outlet 320, and the second outlet 420 to be opened or closed depending on an air conditioning mode.

Hereinafter, it will be described in detail with reference to FIG. 3, FIG. 4, and FIG. 5 how the air conditioning system for a vehicle according to various exemplary embodiments of the present invention operates in each air conditioning mode.

First, referring to FIG. 3, in the cooling mode of the air conditioning system for a vehicle according to various exemplary embodiments of the present invention, the second inlet 410 and the second outlet 420 may be closed via the second valve 600, and the first valve 510 may be opened to connect the first core 300 and the second core 400 to each other such that the coolant introduced from the evaporator 100 through the first inlet 310 circulates through the first core 300 and the second core 400 and is discharged through the first outlet 320.

In the instant case, the coolant cooled while passing through the evaporator 100 may be introduced into the first core 300 through the first inlet 310 and introduced into the second core 400 through the connection line 500 such that the coolant circulates through the first core 300 and the second core 400, and then discharged through the first outlet 320. That is, in the cooling mode of the air conditioning system for a vehicle according to various exemplary embodiments of the present invention, the first valve 510 and the second valve 600 may be controlled to allow the coolant cooled while passing through the evaporator 100 to circulate through both the first core 300 and the second core 400 such that both the first core 300 and the second core 400 are used as heat exchangers for cooling.

Therefore, according to various exemplary embodiments of the present invention, in the cooling mode, both the first core 300 and the second core 400 are used as heat exchangers for cooling in the above-described controlling manner such that an area of a heat exchanger exchanging heat with air supplied to the interior of the vehicle may be increased, and accordingly, cooling performance may be improved.

Furthermore, Referring to FIG. 4, in the heating mode of the air conditioning system for a vehicle according to various exemplary embodiments of the present invention, the first inlet 310 and the first outlet 320 may be closed via the second valve 600, and the first valve 510 may be opened to connect the first core 300 and the second core 400 to each other such that the coolant introduced from the condenser 200 through the second inlet 410 circulates through the first core 300 and the second core 400 and is discharged through the second outlet 420.

In the instant case, the coolant heated while passing through the condenser 200 may be introduced into the second core 400 through the second inlet 410 and introduced into the first core 300 through the connection line 500 such that the coolant circulates through the first core 300 and the second core 400, and then discharged through the second outlet 420. That is, in the heating mode of the air conditioning system for a vehicle according to various exemplary embodiments of the present invention, the first valve 510 and the second valve 600 may be controlled to allow the coolant heated while passing through the condenser 200 to circulate through both the second core 400 and the first core 300 such that both the first core 300 and the second core 400 are used as heat exchangers for heating.

Therefore, according to various exemplary embodiments of the present invention, in the heating mode, both the first core 300 and the second core 400 are used as heat exchangers for heating in the above-described controlling manner such that an area of a heat exchanger exchanging heat with air supplied to the interior of the vehicle may be increased, and accordingly, heating performance may be improved.

Furthermore, referring to FIG. 5, in the dehumidifying mode of the air conditioning system for a vehicle according to various exemplary embodiments of the present invention, the first valve 510 may be closed to disconnect the first core 300 and the second core 400 from each other, and the first inlet 310, the first outlet 320, the second inlet 410, and the second outlet 420 may be opened via the second valve 600 such that the coolant introduced from the evaporator 100 through the first inlet 310 circulates through the first core 300 and is discharged through first outlet 320, and the coolant introduced from the condenser 200 through the second inlet 410 circulates through the second core 400 and is discharged through the second outlet 420.

In the instant case, in a state where the connection line 500 between the first core 300 and the second core 400 is closed by the first valve 510, the coolant cooled while passing through the evaporator 100 may be introduced into the first core 300 through the first inlet 310 such that the coolant circulates through the first core 300, and then discharged through the first outlet 320, and the coolant heated while passing through the condenser 200 may be introduced into the second core 400 through the second inlet 410 such that the coolant circulates through the second core 400, and then discharged through the second outlet 420. That is, in the dehumidifying mode of the air conditioning system for a vehicle according to various exemplary embodiments of the present invention, a temperature of air supplied to a duct 700 through a blower 800 decreases while the air passes through the first core 300 through which the cooled coolant circulates, resulting in a decrease in absolute humidity, and a temperature of the air whose absolute humidity has decreased while the air passes through the first core 300 increases while the air passes through the second core 400 through which the heated coolant circulates, resulting in a decrease in relative humidity, so that high-temperature and dry air may be supplied to the interior of the vehicle, decreasing humidity inside the vehicle.

Meanwhile, referring to FIGS. 6 to 8, the air conditioning system for a vehicle according to various exemplary embodiments of the present invention may further include the duct 700 in which the first core 300 and the second core 400 are mounted and the blower 800 provided at an entrance of the duct 700.

The duct 700 may be branched into a first duct 710 and a second duct 720. The first core 300 may be mounted in front of a branch point at which the duct 700 is branched into the first duct 710 and the second duct 720, and the second core 400 may be mounted in the second duct 720.

Furthermore, a door 712 regulating introduction of air passing through the first core 300 into the interior of the vehicle through the first duct 710 may be mounted in the first duct 710.

Hereinafter, it will be described with reference to FIG. 6, FIG. 7, and FIG. 8 how the door 712 mounted in the first duct 710 operates depending on an air conditioning mode of the vehicle.

Referring to FIG. 6, in the cooling mode, the door 712 may be opened to allow the air passing through the first core 300 to be introduced into the interior of the vehicle through the first duct 710.

Furthermore, referring to FIG. 7, in the heating mode, the door 712 may be closed to interrupt the air passing through the first core 300 from being introduced into the interior of the vehicle through the first duct 710.

Furthermore, referring to FIG. 8, in the dehumidifying mode, the door 712 may be partially closed to allow the air passing through the first core 300 to be partially introduced into the interior of the vehicle through the first duct 710.

As described above, the air conditioning system for a vehicle according to various exemplary embodiments of the present invention may regulate the introduction of air passing through the first core 300 into the interior of the vehicle through the first duct 710 using the door 712 mounted in the first duct 710, regulating an overall temperature of air supplied to the interior of the vehicle, and accordingly, each air conditioning mode may be implemented in a more appropriate way.

According to various exemplary embodiments of the present invention, in the cooling mode, both the first core and the second core are used as heat exchangers for cooling such that an area of a heat exchanger exchanging heat with air supplied to the interior of the vehicle may be increased, and accordingly, cooling performance may be improved.

According to various exemplary embodiments of the present invention, in the heating mode, both the first core and the second core are used as heat exchangers for heating such that an area of a heat exchanger exchanging heat with air supplied to the interior of the vehicle may be increased, and accordingly, heating performance may be improved.

In an exemplary embodiment of the present invention, an actuator is mounted to the first valve 510 and the actuator is connected to a controller to control the operation of the actuator.

In an exemplary embodiment of the present invention, an actuator is mounted to the second valve 600 and the actuator is connected to a controller to control the operation of the actuator.

In an exemplary embodiment of the present invention, an actuator is mounted to the door 712 and the actuator is connected to a controller to control the operation of the actuator of the door 712.

In addition, the term "controller" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An air conditioning system for a vehicle, the air conditioning system comprising:
   a refrigerant line through which a refrigerant circulates and an evaporator and a condenser are connected to each other; and
   a first core and a second core for indoor air conditioning,
   wherein the first core includes a first inlet and a first outlet connected to the evaporator and wherein a first coolant passing through the evaporator is introduced into the first core through the first inlet and the first coolant passing through the first core is discharged to the evaporator through the first outlet,
   wherein the second core includes a second inlet through which a second coolant passing through the condenser is introduced into the second core and a second outlet through which the second coolant passing through the second core is discharged to the condenser,
   wherein the first core and the second core are connected to each other through a connection line, and the connection line is mounted with a first valve selectively connecting the first core and the second core through the connection line, and
   wherein the air conditioning system further includes a second valve configured to regulate the first inlet and the first outlet of the first core and the second inlet and the second outlet of the second core to be opened or closed.

2. The air conditioning system of claim 1, wherein the second valve is slidable, wherein the first inlet and the first outlet of the first core are selectively closed in a sliding movement of the second valve, and wherein the second inlet and the second outlet of the second core are selectively closed in the sliding movement of the second valve.

3. The air conditioning system of claim 1, wherein in a cooling mode, the second inlet and the second outlet are closed via the second valve, and the first valve is opened to connect the first core and the second core to each other so that the first coolant introduced from the evaporator through the first inlet circulates through the first core and the second core and is discharged through the first outlet.

4. The air conditioning system of claim 1, wherein in a heating mode, the first inlet and the first outlet are closed via the second valve, and the first valve is opened to connect the first core and the second core to each other so that the second coolant introduced through the second inlet from the condenser circulates through the first core and the second core and is discharged through the second outlet.

5. The air conditioning system of claim 1, wherein in a dehumidifying mode, the first valve is closed to disconnect the first core and the second core from each other, and the first inlet, the first outlet, the second inlet, and the second outlet are opened via the second valve so that the first coolant introduced from the evaporator through the first inlet circulates through the first core and is discharged through first outlet, and the second coolant introduced from the condenser through the second inlet circulates through the second core and is discharged through the second outlet.

6. The air conditioning system of claim 1, further including:
a duct in which the first core and the second core are mounted; and
a blower mounted at an entrance of the duct.

7. The air conditioning system of claim 6, wherein the duct is branched into a first duct and a second duct, and wherein the first core is mounted upstream a branch point at which the duct is branched into the first duct and the second duct, and the second core is mounted in the second duct.

8. The air conditioning system of claim 7, wherein a door regulating introduction of air passing through the first core into the interior of the vehicle through the first duct is mounted in the first duct.

9. The air conditioning system of claim 8, wherein in a cooling mode, the door is opened to allow the air passing through the first core to be introduced into the interior of the vehicle through the first duct.

10. The air conditioning system of claim 8, wherein in a heating mode, the door is closed to interrupt the air passing through the first core from being introduced into the interior of the vehicle through the first duct.

11. The air conditioning system of claim 8, wherein in a dehumidifying mode, the door is partially closed to allow the air passing through the first core to be partially introduced into the interior of the vehicle through the first duct.

12. The air conditioning system of claim 1, wherein the condenser, an expansion valve, the evaporator and a compressor are connected in series.

* * * * *